United States Patent
Gross

(10) Patent No.: US 7,032,020 B2
(45) Date of Patent: Apr. 18, 2006

(54) SYSTEM AND METHOD FOR DETERMINING SEGMENT AND LINK BANDWIDTH CAPACITIES

(75) Inventor: Gerhard W Gross, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 09/823,132

(22) Filed: Mar. 30, 2001

(65) Prior Publication Data

US 2002/0176367 A1 Nov. 28, 2002

(51) Int. Cl.
*G06F 15/173* (2006.01)
*H04L 12/26* (2006.01)

(52) U.S. Cl. .................. 709/224; 709/226; 370/252
(58) Field of Classification Search ............... 370/252, 370/254, 218, 60
See application file for complete search history.

(56) References Cited

U.S. PATENT DOCUMENTS

| | | | | |
|---|---|---|---|---|
| 5,931,961 | A * | 8/1999 | Ranganathan et al. | 714/712 |
| 5,963,540 | A * | 10/1999 | Bhaskaran | 370/218 |
| 6,575,255 | B1 * | 6/2003 | Rial et al. | 175/57 |
| 6,754,622 | B1 * | 6/2004 | Beser et al. | 704/226 |
| 6,757,255 | B1 * | 6/2004 | Aoki et al. | 370/252 |

OTHER PUBLICATIONS

Leon-Garcia and Widjaja, "Communication Networks Fundamental Concepts and Key Architectures", 2000, The McGraw-Hill COmpanies, Inc., P. 527-528, 530.*
A Bruce Carlson, Paul B. Crilly, and Janet C. Rutledge, "Communication Systems An Introduction to Signals and NOise in Electrical Communication, Fourth Edition", 1968, The McGraw Hill Company Inc, Chater 5, LPages 201-202.*
Carlson et al, "Communication System an Introduction to Signal and Noise in Electrical Communication" 1968, McGraw-Hill Higher Eduction, Forth Edition, p. 201.*
Garcia et al, "Communication Networks Fundamental Concepts and Key Architectures", 2000, McGraw-Hill Higher Education, p. 530, 528.*

* cited by examiner

*Primary Examiner*—Zarni Maung
*Assistant Examiner*—Karen Tang
(74) *Attorney, Agent, or Firm*—Pillsbury Winthrop Shaw Pittman LLP

(57) ABSTRACT

A method for determining bandwidth capacity of a test segment by sending one or more short packet bursts or streams from unique source smart nodes (SNs) over a link, which has the test segment, to one or more destination SNs. Selected source SNs send packet bursts or streams to other selected SNs at precise times so that the packet bursts or streams traverse the test segment simultaneously. Analyses of the traffic flow patterns at the destination SNs, including byte count measurements and time stamps, are used to determine the bandwidth capacity of the test segment.

45 Claims, 7 Drawing Sheets

SYSTEM AND METHOD FOR DETERMINING SEGMENT AND LINK BANDWIDTH CAPACITIES

BACKGROUND OF THE INVENTION

1. Field of the Invention

The present invention generally relates to the determining of bandwidth capacity. More specifically, the present invention relates to a system, method and storage medium embodying computer-readable code for determining segment and link bandwidth capacities in networks and other communication systems.

2. Discussion of the Related Art

The uses of local area networks (LANs) to interconnect a number of computers and other types of digital systems have become common place in businesses. The use of wide area networks (WANs) or metropolitan area networks (MANs) to interconnect network systems in a more grandiose scale has also become prevalent. Small businesses, the number of which has been estimated to be about 2.4 million in U.S. alone, routinely interconnect end hosts, in the form of computers and other types of digital systems, throughout their offices and use them to pass information back and forth and to share common printers, modems, and the like over computer networks. Large corporations and government agencies set up even larger and more complex network systems. These network systems are often referred to as private/enterprise networks, where there is control over network topology.

Diagnostic routines and methods are commonly employed in networks as the end hosts typically operate in such a manner as to perform a common task or mission on a resources allocation or distribution basis. In such an environment, the condition of the network and its ability to reliably transmit data between two end hosts is of critical importance. The data is usually transmitted from one end host to another end host via the network link or path that interconnects the two end hosts. Each of the links is made up of one or more network segments interconnected by network devices, such as routers. If a network connection in the link or the segment is slow or inoperative, one must be able to sense it as soon as possible so that the problem can be repaired or circumvented in a timely manner. Oftentimes, there are problems with one or more of the links, and in particular a segment within a link. This requires the rerouting of the data using a different path. Moreover, from time to time, it necessary to have a large amount of data traffic flowing through the network. In this case, it becomes inefficient to use a link(s) having one or more slow segments to transmit the data flow. This is because overhead increases due to the re-transmitting of lost or destroyed messages.

As a result, knowledge of network link bandwidth capacities, and especially segment bandwidth capacities, is extremely important for optimal network management, utilization and provisioning. Such knowledge has many benefits. This includes uncovering potential bottlenecks in slow paths, which allows a user to avoid such paths when necessary and to prevent congestion. In addition, high bandwidth paths can be identified, which provides value by facilitating tunneling and link balancing, among other things. There are several conventional systems targeted to network management, network analysis, network discovery, network provisioning, network bandwidth management, and/or network bandwidth provisioning. Some of these conventional systems seek to measure the network link bandwidth capacity of a network by installing software and/or hardware at the endpoints of the network. One endpoint is programmed to send traffic to the other endpoint at a high rate. If the rate received at the destination is significantly less than the rate at which the traffic was sent, the received rate is the link bandwidth capacity. However, little or no attempt has been made to measure segment bandwidth capacities.

With the advent of new technologies, private/enterprise networks are constantly being made larger and larger. There may be hundreds of links interconnecting end hosts within a network. Each link may be made up of a number of segments, creating thousands of individual segments in the network. While determining a link bandwidth capacity is important, it does not pinpoint a potential bottleneck created by a slow segment in the link or pinpoint a high bandwidth segment in the link if the link consists of many segments. Within a network, links often share segments with each other, making the determination of the segment bandwidth capacity even more important. Having knowledge of segment bandwidth capacities allows one to pinpoint potential problematic segments or high bandwidth segments. This translates into better use of the network resources because potential bottlenecks can be avoided and high bandwidth segments can be identified and used more frequently than other segments. Therefore, there is a need for a system and method for determining segment and link bandwidth capacities in networks and other communication systems.

BRIEF DESCRIPTION OF THE DRAWINGS

The accompanying drawings, which are incorporated in and form a part of this specification, illustrate embodiments of the present invention and, together with the description, serve to explain the principles of the present invention.

DETAILED DESCRIPTION

Reference will now be made in detail to the preferred embodiments of the invention, examples of which are illustrated in the accompanying drawings. While the present invention will be described in conjunction with the preferred embodiments, it will be understood that they are not intended to limit the invention to these embodiments. On the contrary, the present invention is intended to cover alternatives, modifications and equivalents, which may be included within the spirit and scope of the invention as defined by the appended claims. Moreover, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components and circuits have not been described in detail as not to unnecessarily obscure aspects of the present invention.

Figure 1:
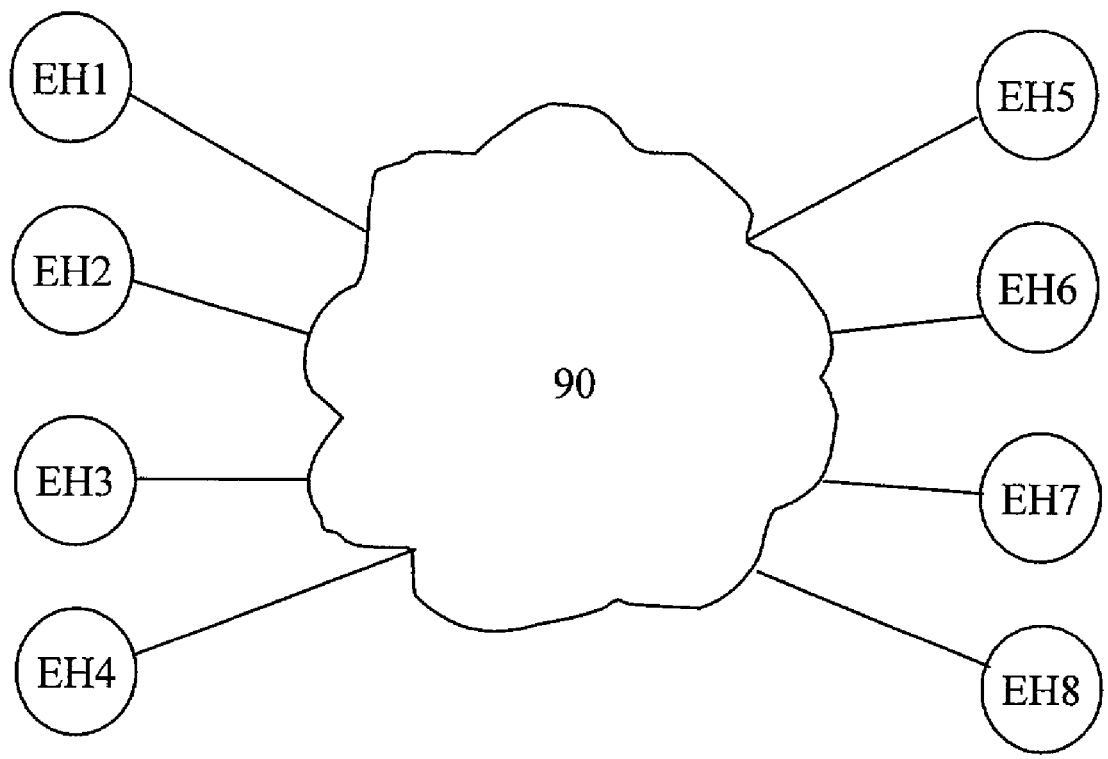
FIG. 1 illustrates a network implementation in which embodiments of the present invention may function.

Embodiments of the present invention are directed to systems, methods and storage media embodying computer-readable codes for determining network segment and link bandwidth capacities in networks and other communication systems. FIG. 1 shows a network implementation in which embodiments of the present invention may function. The network implementation comprises end host sections EH1–EH8 connected to each other via a network link section 90. In one implementation, the network link section 90 includes a number of paths or links, each of which interconnects two end host sections or edge nodes in a path. The network link is made up of one or more network segments interconnected by a network device. The network device(s) may, for example, be a router that uses headers and a forwarding table to determine where packets go. If a network link is made up of one network segment, then the link is equal to the network segment. In this case, the network link/segment has end hosts or edge nodes on its ends. If a network link is made up of two or more network segments, then the network segments are separated from and connected to each other by a network device(s). To make a determination of the segment and link bandwidth capacity in the network implementation, packet profiles are sent from at least one source edge node (not shown) over the segment and the link to at least one destination edge node (not shown). As their name implies, the source and destination edge nodes reside on the edge of the network link section 90. The packet profiles may, for example, be one or more short packet bursts or one or more packet streams.

Figure 2:
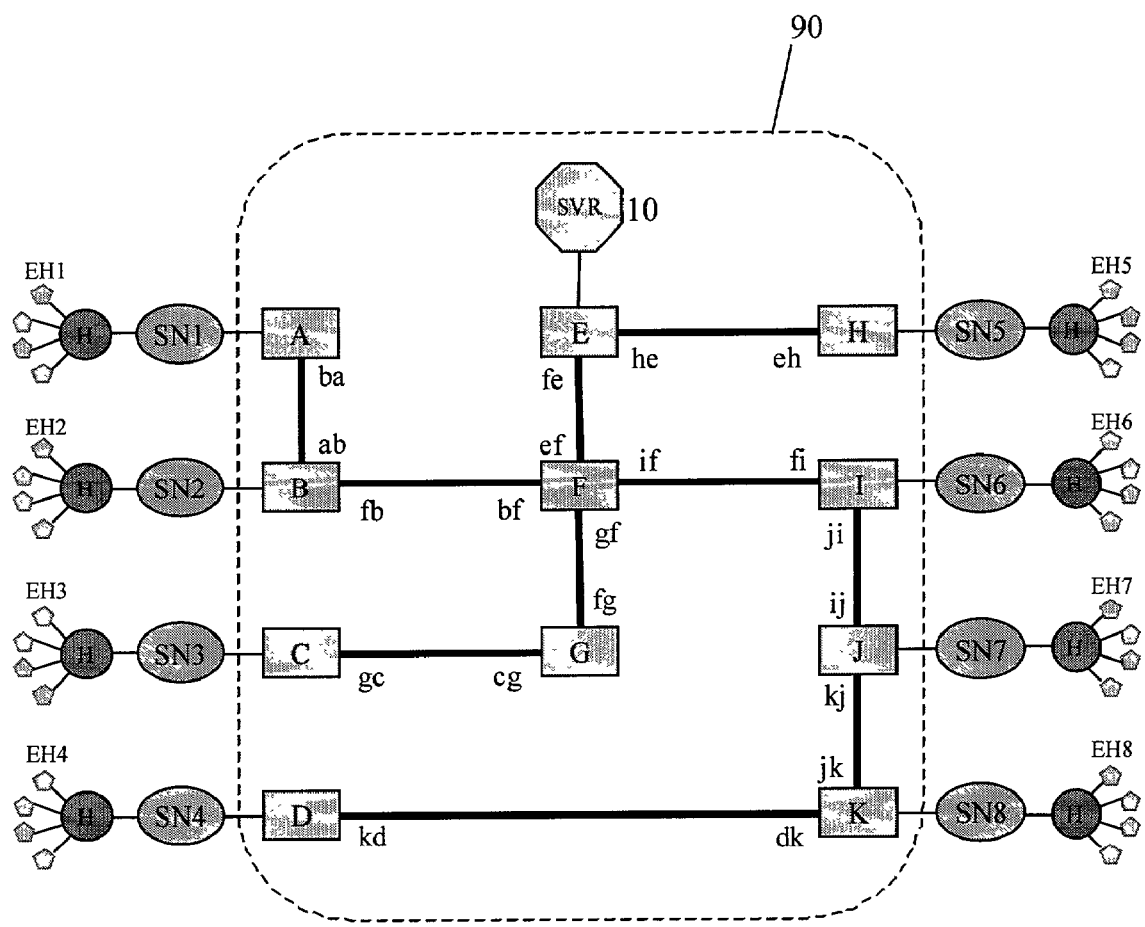
FIG. 2 shows an illustrative example of a network system that contains smart nodes according to an embodiment of the present invention.

With reference now to FIG. 2, a network system having source and destination nodes in accordance with an embodiment of the present invention is illustrated. In the present invention, the source and destination nodes have special functions, and they are hereinafter referred to as source and destination Smart Nodes (SNs). In the embodiment, the network system 100 comprises the end host sections EH1–EH8, SNs SN1–SN8 and a network link section 90. The network link section 90 includes network devices A–K and a central server 10 interconnected with links and segments. Segments or links are shown in the figure as bold line connections connecting two network devices, which may be two routers. For example, the segment connecting network device A and network device B is referred to as segment "ab" when segment is carrying packet profiles flowing from network device A to network device B, and as segment "ba" when segment is carrying pack profiles flowing from network device B to network device A. The link connecting network device D and network device K is referred to as segment "dk" when segment is carrying packet profiles flowing from network device D to network device K, and as segment "kd" when segment is carrying packet profiles flowing from network device K to network device D. In other works, the network segments/links are identified by lower case letters, which identify, in order, the source and destination network devices on either side of the segment.

As shown in FIG. 2, each end host section may be further broken into several end hosts interconnected together via a hub. For example, end host section EH1 includes four end hosts interconnected together via a hub H. The same arrangement exists for end host sections EH2–EH8. The SNs SN1–SN8 are generally distributed at the edges of a network, and they are shown distributed at the edges of the network system 100 in the embodiment shown in FIG. 2. In the embodiment, the SNs SN1–SN8 exist in stand-alone boxes and are added to the network system 100, being placed in-line between a hub and a network device. Each of the stand-alone box SN comprises a hardware portion and a software portion. The hardware portion includes two network interface cards (NIC), one connecting the SN to the hub and one connecting the SN to the network device. The software portion would allow the link/segment bandwidth capacity to be determined. According to another embodiment of the present invention, the SNs SN1–SN8 may be added as software modules to either existing end hosts EH1–EH8 or network devices A–D, H–K along the edges. Other embodiments of the SNs may be implemented, so long as the SNs are deployed so that end host sections are linked to the network through corresponding SNs.

Each of the SNs, SN1–SN8, is under the centralized control of the central server 10. An initialization process is provided when SNs SN1–SN8 come on-line, allowing the central server 10 to become aware of the SNs SN1–SN8. Depending on which segment(s) or link(s) is to be tested, a select number of source SNs is commanded by the central server 10 to send packet profiles to destination SNs at precise times. Analyses of the traffic flow patterns at the destination SNs are used to determine the segment/link bandwidth capacity.

Many methods may be utilized by the central server 10 and the SNs SN1–SN8 to command, send, receive and/or analyze packet profiles. For example, a notion of policies and a common open policy service (COPS) protocol may be used. At least one policy, created at the central server 10, specifies that a packet profile is to be generated at a specified start time with a specified rate, packet size, number of the packets in the profile or length of the profile, etc. The policy(ies) is sent to one or more selected number of source SNs using the COPS protocol. The SNs have the ability to understand policies and install the policies on themselves, allowing them to send packet profiles to other SNs at precise times. Moreover, the central server 10 also creates monitoring policies and sends them to both source and destination SNs. The monitoring policies specify flows to monitor based on source and destination IP addresses and port numbers. The number of bytes and packet profiles as well as first and last packet profile time stamps/measurements are recorded at the monitoring SNs. Although an illustrative example is described here, it is noted that the specifics of how packet profiles are commanded, sent, received and analyzed are not important. It is only important that the SNs can be commanded to send packet profiles to other select SNs at precise times.

The present invention applies in both a time synchronized network and a non-time synchronized network. In general, time synchronization of a network refers to the degree to which all the SNs in a network have their clocks set to the same time. In a time synchronized network, the SNs SN1–SN8 have synchronized clocks. In a non-time synchronized network, the SN clocks are offset, for example, by several seconds or more. As a result of the different time synchronization between a time synchronized network and a non-time synchronized network, different characteristics are imparted in the two type of networks. For example, in a time-synchronized network, the packet profiles used in determining bandwidth capacity are one or more short packet bursts. On the other hand, in a non-time synchronized network, the packet profiles used in determining bandwidth capacity are one or more packet streams.

Aside from the degree of time synchronization, the SNs in a time synchronized network also exhibit different characteristics, as opposed to those in a non-time synchronized network. SNs of the former type have the capabilities of sending customized packet bursts to other SNs, classifying and counting bytes in packet bursts from other SNs, and determining and storing first and last packet arrival times for bursts from each SN source. In contrast, SNs of the latter type have the capabilities of sending customized packet streams to other SNs as well as classifying and counting bytes in packet streams from other SNs over specified time periods. In one implementation, the packet burst or packet stream traffic is normal User Datagram Protocol/Internet Protocol (UDP/IP) traffic. The Internet Protocol (IP) addresses in these packets are those of the source and destination SNs. The packets within the packet burst and the packet stream may also be optionally tagged as high priority by using, for example, the IP Type of Service (TOS) field in the header of the packets. The classification capabilities of the SNs allow the SNs to distinguish between test traffic and other traffic. Common classification scheme, such as the 5-tuple, may be employed.

Figure 3:
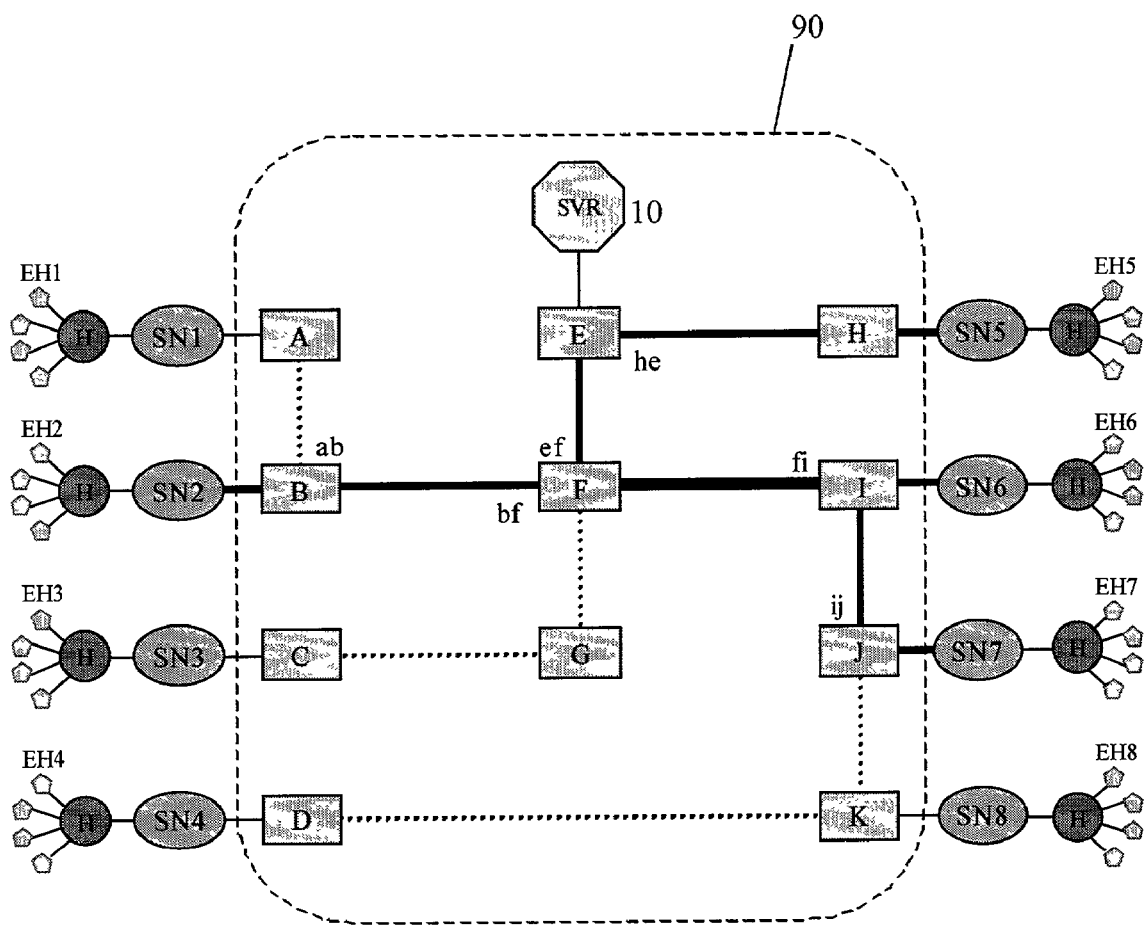
FIG. 3 shows an illustrative example of a time synchronized network system with a particular segment under test according to an embodiment of the present invention.

FIG. 3 shows an illustrative example of a time synchronized network system with a particular segment under test in accordance with an embodiment of the present invention. The particular segment, segment fi, under the test is shown as a thick bold line for clarity purpose. The segments/links involved in the test are shown as regular bold lines, and the segments/links not involved in the test are shown as dash lines. As discussed, network segments/links are identified by lower case letters, which identify, in order, the source and destination network devices on either side of the segment. Therefore, the segment under the test, or the test segment fi, represents the segment that has the network device F as the source and the network device I as the destination. To determine network segment bandwidth capacity in a time synchronized network system, a single packet burst may be used. However, in cases where the segment under test, such as segment fi, is shared by more than one link, multiple test packet bursts are applied simultaneously. This serves to drive as much test traffic through the segment under the test as possible in order to probe its capacity limits.

As shown in FIG. 3, the example test segment fi is shared by a number of different links, including, but not limited to, links from SN1 to SN8, SN2 to SN6, SN5 to SN7 and SN3 to SN6. Other links may also be formed by the central server 10, as a link may be seem as a network path between any end hosts or edge SNs. A link is made up of one or more network segments. For example, the link from SN2 to SN6 consists of the segments bf and fi in order from source to destination. Link bandwidth capacity is determined by measuring the bandwidth capacity of each of the segments that make up each link, and a link has the maximum throughput of the slowest segment in the link.

As an illustrative example, two of the links are used to determine segment bandwidth capacity of the test segment fi. Traffic packet bursts are sent simultaneously from SN2 to SN6 and from SN5 to SN7. Additional bursts may be added over other links that include segment fi, such as SN1 to SN8 and SN3 to SN6. In one implementation, each packet burst comprises multiple packets spaced closely together. The size of packets within the packet burst is preferably chosen to be close to what the average packet size would be for normal network traffic, allowing it to be large enough to supply optimal transmission and small enough to prevent fragmentation. Traffic other than the test packet bursts used in the test should not be present during the test. Optionally, to avoid causing excessive disruption in normal network traffic, all burst traffic may be marked as high priority using the IP header TOS field for distinction, so that it gets preferred treatment. In this case, the only restriction is that normal network traffic be confined to best effort. However, if it is determined that other traffic will not be present, i.e., there is no normal best effort traffic nor any high priority traffic, the packet burst traffic does not need to be marked as priority packets.

In one implementation, all packet burst traffic supplied simultaneously is timed so that they traverse the segment under test at the same time. In the illustrative example, the packet burst originating from SN SN2 and the packet burst originating from SN SN5 are timed so that both packet bursts traverse the test segment fi at the same time. SNs SN2, SN5, acting as source SNs for packet burst traffic, are commanded by the central server 10 to send their packet bursts to the destination SNs SN6, SN7, respectively, at precise times. Due to differences in the propagation times between the source SNs SN2, SN5 and the test segment fi, the time for sending the packet burst from SN2 typically differs from the time for sending the packet burst from SN5. As shown in FIG. 3, the test segment fi is one hop away from source SN2 and two hops away from source SN5. As a result, traffic would likely take longer to propagate from SN5 to test segment fi than from SN2 to segment fi. If that is the case, the traffic burst sent from SN2 is delayed a calculated amount of time so that both packet bursts flow through segment fi simultaneously. Various methods may be employed to measure the calculated delay. For example, the calculated delay, latency, may be determined by examining the time for a packet to travel between a source SN and the segment under the test. This is done for all source SNs involved in the test. Traffic burst start time is then modified so that all packet bursts arrive at the segment under the test at the same time.

The length of the packet burst sent by each source should be long enough to reduce error associated with the measured value of the bandwidth capacity of a particular link or segment to an acceptable level. This will depend on the inherent error in synchronization of SNs' clocks and differences in burst propagation times from the source SNs SN2, SN5 to segment fi. The error in synchronization of SNs' clocks is often referred to as the clock offset between network devices. The differences in burst propagation time may be found by determining the latency between a source SN and the segment under test. The error from both of these sources, among others, combined is hereinafter referred to as the maximum expected Degree of Desynchronization (DoD), which has units of time, such as milliseconds. The burst length, L, is calculated using the following formula:

$$L = \frac{DoD}{ErrLim}$$

where ErrLim is the maximum desired error in the segment bandwidth measurement, the value of which is chosen based on particular needs of a bandwidth capacity test. For example, with a DOD of 15 milliseconds (ms) and a desired error of 10% or less in segment bandwidth determination, the burst length should be 150 ms, or $$L = \frac{15 \text{ ms}}{0.1}.$$

After packet bursts with the desired packet size, delay times, and burst length are sent from specified source SNs SN2, SN5 in a time-synchronized network, the packet bursts traverse through the link from source SN SN2 to destination SN SN6 and the link from source SN SN5 to destination SN SN7. The link from SN SN2 to SN SN6 consists of segments bf and fi, while the link from SN SN5 to SN SN7 consists of segments he, ef, fi and ij. Before reaching segment fi, both packet bursts travel independently of each other. The packet burst from source SN SN2 travels through the segment bf by itself, and the packet burst from source SN SN5 travels through the segments he and ef by itself. Ideally, when a packet burst goes through a segment by itself, there is no packet spreading. Packet spreading occurs when a packet burst goes through a segment that has a rate capacity less than the rate of the packet burst. Assuming that the rate of each of the packet burst does not exceed the capacity of the segments when it travels through the segments by itself, there will be close to no packet spreading.

When both packet bursts travel to network device F, they enter the test segment fi at approximately the same time. As a result, multiple packets travel through the test segment fi in a time-synchronized network at the same time, or close to the same time, by offsetting start times from the source SNs SN2, SN5 and synchronization of SN clocks. Because the packet bursts come together only at the test segment fi, more packets go through the test segment fi than any other segments involved in the test. This effectively attempts to saturate the test segment fi, so that the sum of the burst rates of the packet bursts exceeds the segment capacity of the test segment fi. This creates packet spreading, which allows segment bandwidth capacity of the test segment fi to be determined. Although only two packet bursts are illustrated in the example, it should be apparent to those in the art that it is advantageous to have as many packet bursts available for driving through the segment under test. This way, saturation of the segment under test is achieved, and any packet spreading observed at the destination SNs is likely due to this saturation.

Because both packet bursts arrive at the test segment fi at essentially the same time, they also leave the test segment fi at essentially the same time. When the packet bursts leave, they again travel on independent courses. The packet burst from source SN SN2 travels from the network device I to destination SN SN6, while the packet burst from source SN SN5 travels to the segment ij, and then to destination SN SN7. The packet bursts go off on their own separate courses to the destination SNs SN5, SN7. Since the packet bursts travel independently of each other, it is likely that little, if any, packet spreading occurs. As mentioned, these concepts of packet spreading and attempting saturation of the segment under test are important to the determination of segment bandwidth capacity, and they will be further discussed later.

In the present invention, the destination SNs SN1–SN8 listens for packets coming from one or more specified source SNs. In the illustrative example of FIG. 3, the destination SNs SN6, SN7 listen for packets coming from the source SNs SN2, SN5. In one implementation, this task is performed by a classification module residing in each of the destination SNs SN6, SN7. The classification module provides the ability for the SNs to classify packet bursts, which may, for example, be classified base on the 5 tuple: src/dest IP addr/port num and protocol type. The classification module checks the 5-tuple of all incoming packets, which is found in the IP header and/or the UDP header, for those that match the 5-tuple specified in the monitoring policy associated with a particular test.

Upon determining that the incoming packets is from a specified source SN, a destination SN places a time stamp on the first packet received from each source SN ($TS_{first}$) and a time stamp on the last packet received from each source SN ($TS_{last}$). In the illustrative example, the destination SN SN6 would place time stamps on the first and last packets received from SN2, while the destination SN SN7 would place time stamps on the first and last packets received from SN5. In one implementation, the monitoring policy is utilized to determine which packet in a particular packet burst is the first packet and which is the last packet. The destination SNs SN6, SN7 have a notion of a sampling period, which is set by a user or a program in the monitoring policy. A typical value would be somewhere between 1 and 5 seconds. The first packet is the first packet in a sample period interval, and the last packet is the last one in the sample period interval.

In one implementation, time stamping is accomplished by storing the respective arrival times in a storage device contained in the destination SNs SN6, SN7. The stored time stamp data are sent from the destination SNs SN6, SN7 to the central server 10 periodically. The period may, for example, be set through the monitoring policy and may typically be on the order of 2–10 seconds. On the central server 10, the time stamp data are stored on, for example, a disk. In other implementations, the respective arrival times may be stored in the end host sections EH1–EH8 or directly in the central server 10.

Besides taking time stamps, the destination SNs SN6, SN7 also count the bytes of the packet burst. This information is also stored in the similar fashion as the time stamps $TS_{first}$ of the first packet and time stamps $TS_{last}$ of the last packet. In one implementation, the destination SNs SN6, SN7 count bytes in the packet bursts using a simple counter at the network driver level. If the classification module determines that the current packet fits the 5 tuple specified in the monitoring policy, the counter is increased by the size, in bytes, of the packet. Thus, after all of the packet bursts have been received by the destination SNs SN6, SN7, the first and last packet time stamps of each burst and the byte count $Bytes_{total}$ of each burst are stored. The flow rate due to each packet burst is calculated using the following formula:

$$Rate(\text{bps}) = \frac{Bytes_{total} * 8}{TS_{last} - TS_{first}}$$

The individual packet flow rate or bandwidth in bits per second (bps) is calculated directly by dividing the byte count $Bytes_{total}$, which is multiplied by 8 to acquire the number of bits, by the first and last packet time difference. In the illustrative example, two individual flow rates are derived from the packet burst from SN2 to SN6 and the one from SN5 to SN7. The total flow rate through the segment fi, or the segment bandwidth capacity, is the sum of all individual flow rates. Assuming that the packets burst did not spread in time any further between the test segment fi and the destination SNs SN6, SN7, the sum of the individual bandwidths measured at the destination SNs SN6, SN7 is an accurate value of the segment bandwidth capacity of the segment fi. Even if packet spreading occurs at segments other than the test segment fi, this total flow rate still represents a minimum rate capacity of the test segment fi, or the segment under test, i.e., the lower bound of the segment bandwidth capacity of the test segment fi. As shown in the formula above, the flow rate of a packet burst through the test segment fi is inversely proportional to the difference between the last packet arrival time $TS_{last}$ and the first packet arrival time $TS_{first}$ at destination SN. Because multiple packet bursts travel together only at the test segment fi and travel independently otherwise, residing in this difference is the packet spreading that occurs when the packet burst traversed the test segment fi together. This relationship exists because of the notion of spreading and attempting saturation through multiple packet bursts travelling through the test segment fi at the same time.

As eluded earlier, packet spreading may sometimes occur at places other than the segment under test. For example, if there were very slow segments between a source SN and the segment under test, or between the segment under test and a destination SN, a packet burst(s) traveling through those segments may spread as they traverse the segments. A very slow segment may, for example, exist when old equipment is used between the source SN and the segment under test or between the segment under test or the destination SN. Packet spreading may also occur if packet bursts traverse through share segments other than the test segment. For example, this occurs if the link from SN SN1 to SN SN7 and the link from SN SN2 to SN SN6 were used to probe the bandwidth capacity of the test segment fi. In this case, the two links have two shared segments—bf, fi. If one or more packet bursts did spread before traveling to the segment under test or between the segment under test and the designated destination SN, the resultant calculated rate for the segment bandwidth capacity would be lower. However, if packet bursts were sent from as many unique source SNs as possible using as many end to end links as possible, the discrepancy introduced by the packet spreading at other places may be at least partially compensated. This way, the result segment bandwidth capacity value approaches the absolute upper limit of capacity for that particular segment. This is true because there would be no way to get more bandwidth out of that particular segment when all the packet bursts traverse the segment at about the same time, flooding the segment with traffic. The more packet bursts that are sent, the more emphasis is put on that particular segment because the packet bursts will flow through different segments while going from source SN to destination SN except the packet bursts will all flow through the segment under the test.

In one embodiment, the SNs and/or the central server 10 are equipped with logic and/or software that allows them to have the knowledge of the network links and segments. For example, the SNs and/or the central server 10 may remember that a particular segment is relatively slower than the other segments. In this case, care can be taken so that a link that contains this slow segment is avoided when testing the bandwidth capacity of another segment or link. Discrepancy introduced by the slow segment is then avoided.

Figure 4:
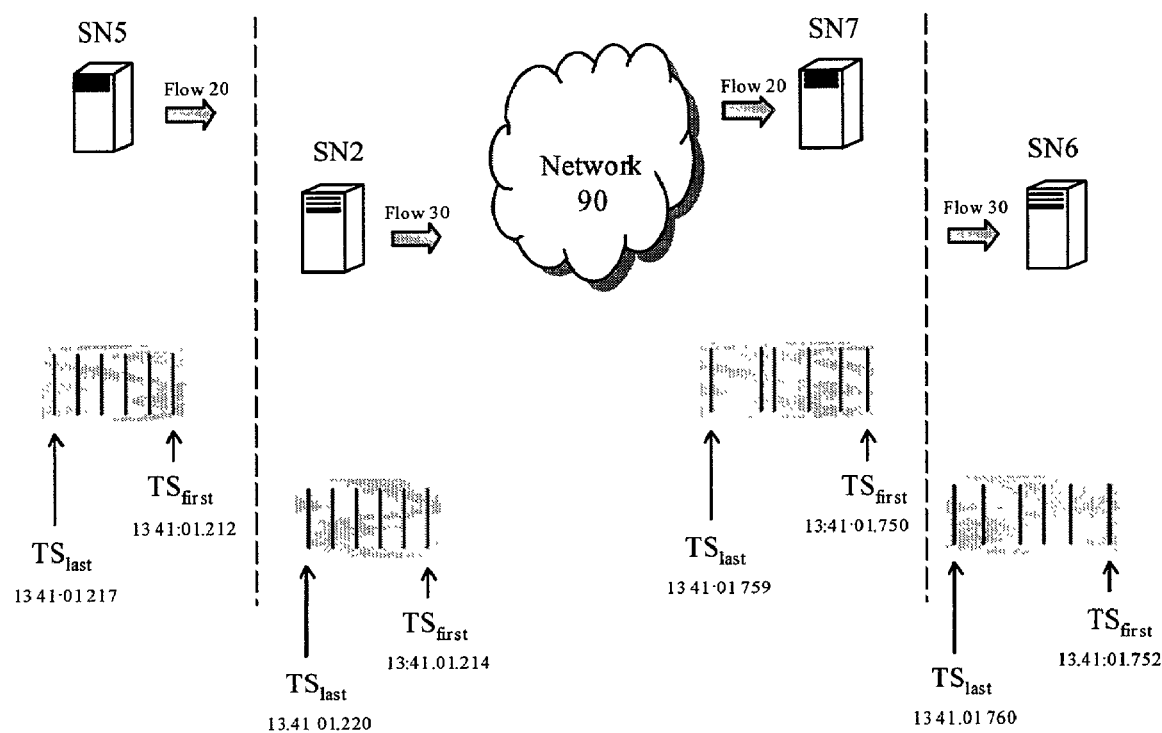
FIG. 4 shows an illustrative example of a multiple test packet burst profile according to an embodiment of the present invention.

FIG. 4 shows an illustrative example of a multiple test packet burst profile according to an embodiment of the present invention. Shown in the figure are hypothetical bursts from a SN SN2 to a SN SN6 and a SN SN5 and a SN SN7. The hypothetical packet bursts flows through the network link section 90. Below each SN, the first and last packet time stamps $TS_{first}$, $TS_{last}$ at that SN for each traffic flow of flows 20, 30 are indicated. The start times of the packet bursts from the SN SN5 and the SN SN2 are coordinated and timed so that the packet bursts would flow through the segment under test, a segment fi, at approximately the same time. For example, the first packet of flow 20 from source SN SN5 is sent at time $TS_{first}$ 13:41:01.212, while the first packet of flow 30 from source SN SN2 is sent at time $TS_{first}$ 13:41:01.214.

In FIG. 4, each packet burst includes six packets, which were used solely for simplicity of illustration. Actual packet bursts would likely include more than six packets. The $TS_{first}$ and $TS_{last}$ of flow 20 at destination SN7 are 13:41:01.750 and 13:41:01.759, respectively, and the $TS_{first}$ and $TS_{last}$ of flow 30 at destination SN6 is 13:41:01.752 and 13:41:01.760. Assuming each packet contains 1000 bytes, with each packet burst containing six packets, the rate of flow 20 in bps is $$R_{Flow1} = \frac{Bytes_{total} * 8}{TS_{last} - TS_{first}} = \frac{1000 * 6 * 8}{0.759 - 0.750} = 5.33 \text{ Mbps}$$

Similarly, the rate of flow 30 in bps is $$R_{Flow2} = \frac{Bytes_{total} * 8}{TS_{last} - TS_{first}} = \frac{1000 * 6 * 8}{0.760 - 0.752} = 6.00 \text{ Mbps}$$

The total flow rate through the shared segment, or the test segment fi, is 5.33 Mbps+6.00 Mbps=11.33 Mbps The above example employs two links, i.e. two flows 20, 30, to determine the bandwidth capacity of the test segment fi. If only one link is used to determine the segment bandwidth capacity, the resultant rate may be less than or equal to 11.33 Mbps. If three or more links are used, the resultant rate may be greater than or equal to 11.33 Mbps.

Figure 5:
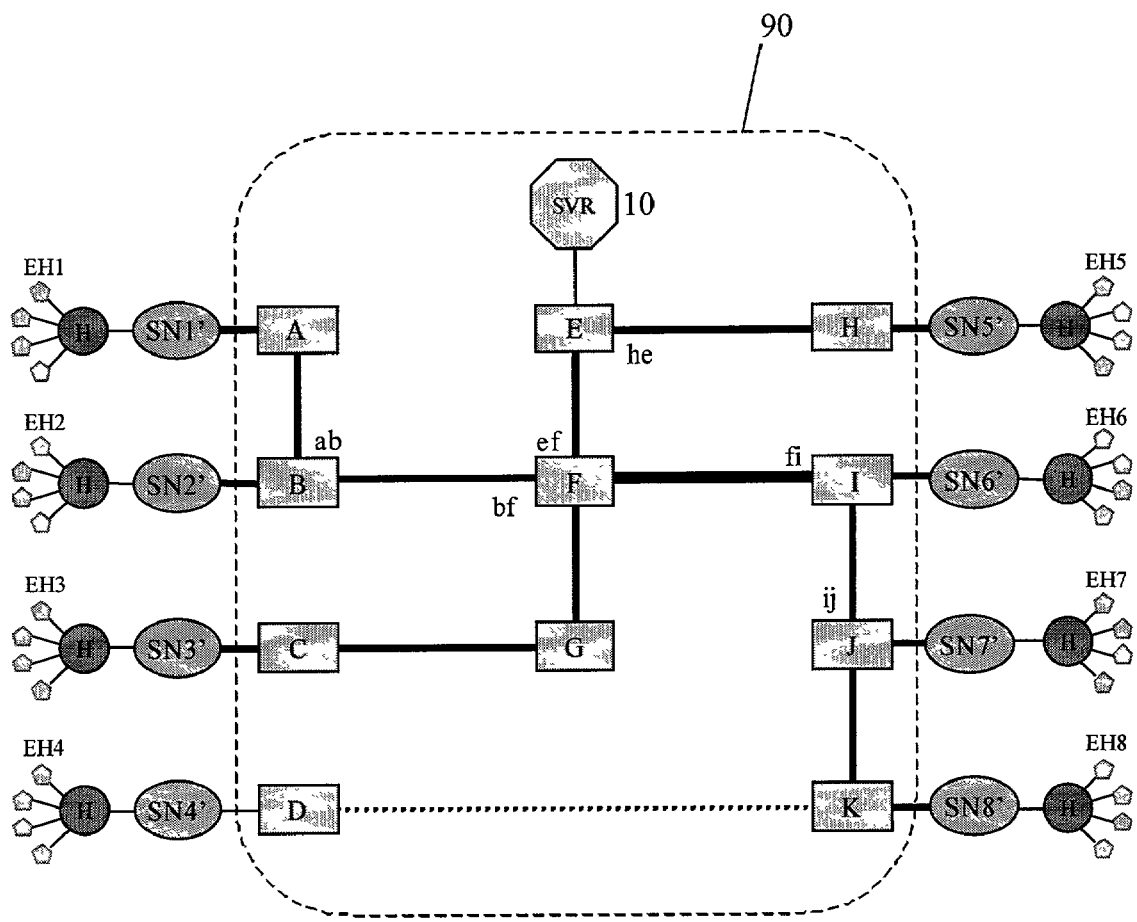
FIG. 5 shows an illustrative example of a non-time synchronized network system with a particular segment under test according to an embodiment of the present invention.

In addition to application in a time synchronized network, the present invention also applies in a non-time synchronized network. In a non-time synchronized network, the SN clocks are not synchronized but offset. Because time synchronization is not available in such network, packet streams are used as the packet profiles for determining bandwidth capacity. The SNs in such network also function differently and have the capabilities of sending customized packet streams to other SNs as well as classifying and counting bytes in packet streams from other SNs over specified time periods. FIG. 5 shows an illustrative example of a non-time synchronized network system with a particular segment under test according to an embodiment of the present invention. Like in FIG. 3, the particular segment, segment fi, under the test is shown as a thick bold line for clarity purpose. The segments/links involved in the test are shown as regular bold lines, and the segments/links not involved in the test are shown as dash lines. Because the SNs in a non-time synchronized network function differently than those in a time synchronized network, they are designated as SN1'–SN7' in FIG. 5. The network devices A–K and the end hosts EH1–EH8 are similar to those in a time synchronized network, so they are designated by the same numerals.

To test network segment bandwidth capacity in a non-time synchronized network system, a single packet stream may be used. Moreover, in cases where the segment under test, such as segment fi, is shared by more than one link, multiple test packet streams may be applied simultaneously. This serves to drive as much test traffic through the segment under the test as possible in order to probe its capacity limits.

In bandwidth capacity testing using a single packet stream, the packet stream comprises multiple packets spaced closely together. This packet stream is sent from a source SN to a destination SN. The packet size should be large enough to supply optimal transmission and small enough to prevent fragmentation. The length of the single packet stream, or stream duration, $L_{single}$, is important in determining the segment bandwidth capacity of the segment under test. Care must be taken so that at least two measurements are taken at the destination SN while the packet stream is being received. The stream duration $L_{single}$ should be a fraction greater than two times the measurement period T by the destination SN. This is expressed by the following formula:

$$L_{single} = (2*T) + 2\epsilon$$

where $\epsilon$ is a small fraction of T, such as 3% and it is used to compensate for small timing errors. The measurement period T is set by a user, either an operator or a program. For the single stream, there is no optimum measurement period T. A shorter period T has the advantage of completing the test sooner, and a longer period T has the advantage of averaging a larger sample in the number of bytes per packets. This leads to a more accurate bandwidth capacity result.

Figure 6A:
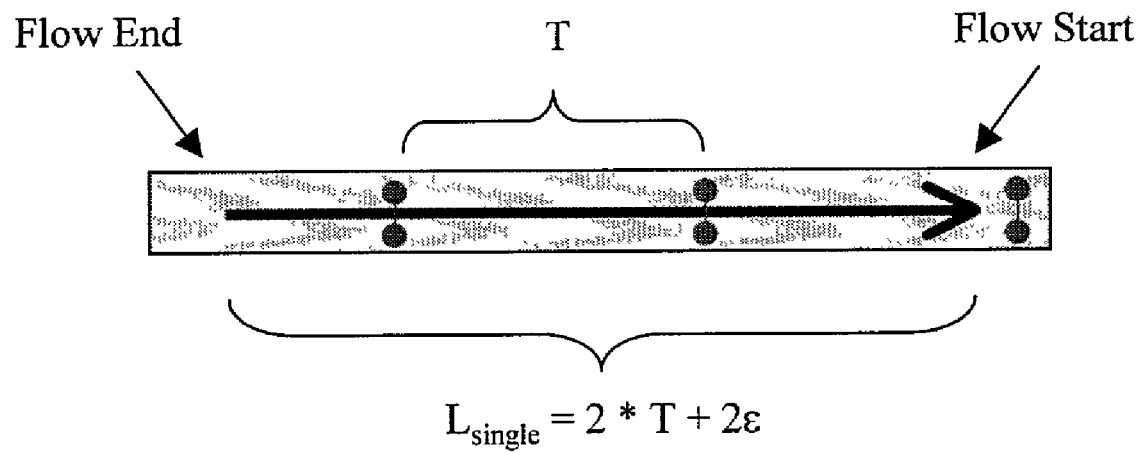
FIG. 6a shows an illustrative example of a single test packet stream profile according to an embodiment of the present invention.
Figure 6B:
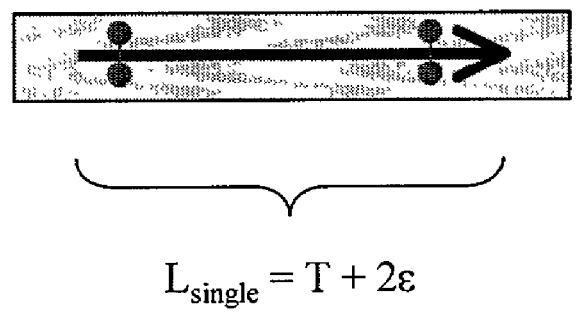
FIG. 6b shows another illustrative example of a single test packet stream profile according to an embodiment of the present invention.

FIGS. 6a and 6b show illustrative examples of a single test packet stream according to an embodiment of the present invention. FIG. 6a depicts a general case, where the stream length $L_{single}$ of the flow is described by the above expression. The packet stream is represented by an arrow going from left to right. The left end is the end of the flow and the right end is the beginning of the flow. The short, vertical dumbbells represent times when SN time measurements, or measurement time stamps, are taken at the destination SN. The measurement time stamps of the first and second measurements are hereinafter referred to as $MT_{first}$ and $MT_{second}$, respectively. As shown in FIG. 6a, the stream length $L_{single}$ ensures that at least two measurements are taken at the destination SN while the stream is being received. The time measurement toward the beginning of the flow is $MT_{first}$ and the time measurement toward the opposite end is $MT_{second}$. In one implementation, the destination SN starts taking measurement when it receives a monitoring policy. The start time for measurements may be given as a parameter in the monitoring policy. In addition to the time measurements, the destination SN for the bandwidth capacity test is commanded to make byte count measurements over each measurement period T, such as one second. In one implementation, the byte count is incremented by the packet size each time a packet arrives that matches the 5-tuple supplied in the monitoring policy. At each measurement, the destination SN stores the time stamps $MT_{first}$, $MT_{second}$ and the byte count since the last measurement in memory. This information is sent periodically to the central server 10, where the information is then stored on disk.

According to an embodiment of the present invention, the stream length $L_{single}$ of the flow can be made shorter, allowing the bandwidth capacity test to be performed more efficiently. Methods are employed to trigger the destination SN to take the first measurement when it receives the first few packets in the test packet stream. In one implementation, this SN trigger mechanism is achieved by software in the destination SN when the first few packets arrive. Because packet/byte detection is already done in the classification module, such information may be used by the software to trigger the destination SN to take the first measurement after receiving the first few packets. This is depicted in FIG. 6b, where $$L_{single} = T + 2\epsilon$$

In this case, the stream length $L_{single}$ of the flow can almost be halved as compared to the non-SN trigger mode. Because the SN triggering mechanism is employed, two measurements are still able to be taken at a destination SN despite the shortened stream length.

The flow rate of the packet stream is calculated directly from these measurements by dividing the period bit count, which is the number of bytes multiplied by 8, by the time difference between the two measurements $MT_{first}$, $MT_{second}$. This is expressed by the following formula:

$$Rate(bps) = \frac{Bytes_{total} * 8}{MT_{second} - MT_{first}}.$$

In bandwidth capacity testing using multiple packet streams, the packet streams are sent from several unique source SNs to destination SNs over a number of links that share the segment under test. As shown in FIG. 5, the example test segment fi is shared by a number of different links, including links from SN SN1' to SN SN8', from SN SN2' to SN SN6', from SN SN5' to SN SN7' and from SN SN3' to SN SN6'. For illustrative purpose, the above four links are used in the following example that probes the segment bandwidth capacity of the test segment fi. In other implementations, additional streams may be added over other links that include the test segment fi. Each packet stream comprises multiple packets spaced closely together. Traffic other than the test packet streams should not be present during the bandwidth capacity test. Optionally, to avoid causing excessive disruption in normal network traffic, all test packet streams may be marked as high priority using the IP header TOS field for distinction.

All packet streams supplied simultaneously must be timed so that they traverse the test segment fi at approximately the same time. The central server 10 commands the source SNs SN1', SN2', SN5', SN3' to send their packet streams to their corresponding destination SNs SN8', SN6', SN7', SN6' respectively, at precise times. The flow from SN SN1' to SN SN8' is referred to as flow 20'. The flow from SN SN2' to SN SN6' is referred to as flow 30'. The flow from SN SN5' to SN SN7' is referred to as flow 40'. The flow from SN SN3' to SN SN6' is referred to as flow 50'. Additional delays are added to the start of the transmission of each of the flows 20'–50' if necessary. As illustrated by the four links used, the destination SNs for two or more packet streams may be the same. For example, the link SN2' to SN6' and the link SN3' to SN6' have the same destination SN, namely SN6'. Because SN SN6' is next to the test segment fi, further packet spreading is not possible. This is because there is no common segment for the packet streams traveling through the two links to traverse before reaching the same destination SN SN6'. The destination node is able to distinguish multiple packet streams received at approximately the same time and to make time stamps and byte count measurements separately. In one implementation, the destination SN uses packet classifiers based on the common UDP/TCP/IP tuple, allowing it to measure statistics on packet streams from each source SNs separately. The same principle applies to destination nodes for multiple packet bursts in a time synchronized network.

In using the multiple packet streams, the length $L_{multiple}$ of the packet streams should be long enough to reduce error to an acceptable level. This will depend on the DoD, which includes the inherent error in synchronization of the clocks of SNs SN1'–SN7' and the differences in packet stream propagation times from the source SNs SN1', SN2', SN5', SN3' to the test segment fi. The DoD has units of time, such as seconds. The length of each packet stream $L_{multiple}$ is calculated using:

$$L_{multiple} = (4*T) + 2\epsilon$$

where T is the time measurement period at the destination SNs and is set to be one half of DoD:

$$T = \frac{DoD}{2}$$

Epsilon is used to compensate for small timing errors and is usually a small fraction of T.

Figure 7A:
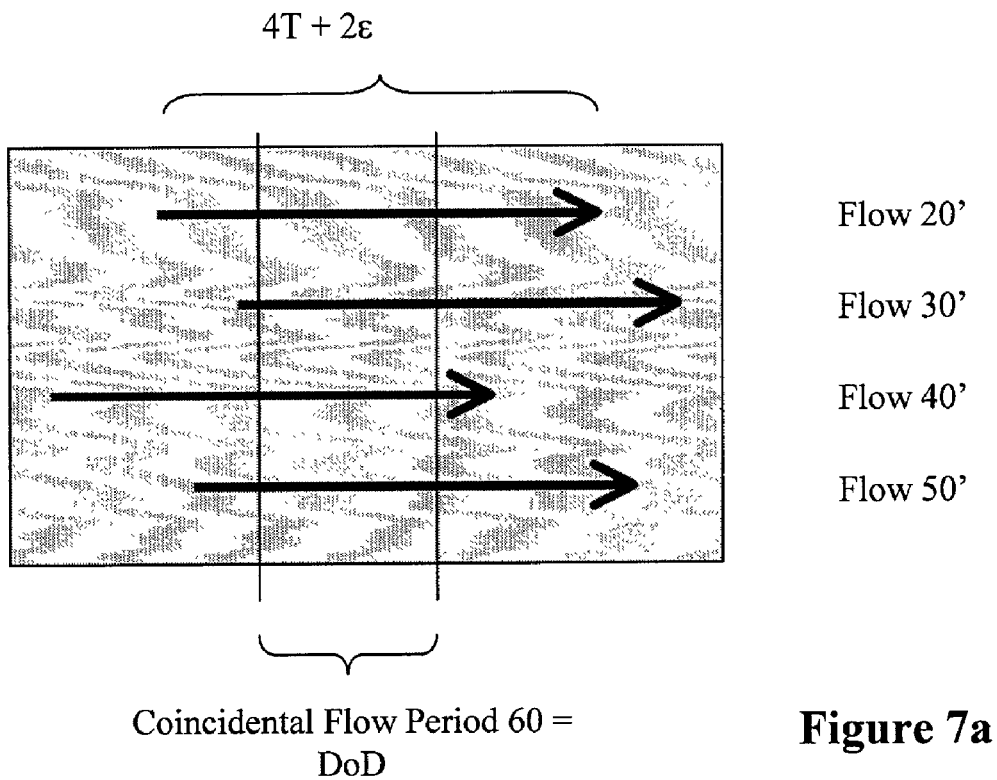
FIG. 7a shows an illustrative example of multiple test packet streams travelling through a segment under test according to an embodiment of the present invention.

FIG. 7a shows the illustrative example of the four multiple test packet streams travelling through test segment fi according to an embodiment of the present invention. The bold arrows are test packet streams, representing flows 20'–50'. The length $L_{multiple}$ of each packet stream of flows 20'–50' is 4T+2ϵ. In general, due to timing errors, each test packet stream arrives at the test segment fi at different times. However, as shown in FIG. 7a, this method ensures that for a period of time of at least DoD, all flows 20'–50' simultaneously flow through the test segment fi. This is referred to as the "coincidental period" 60 and is represented by vertical lines in FIG. 7a. In one implementation, the maximum separation in time between flows, such as flow 30' and flow 40', is DoD.

Figure 7B:
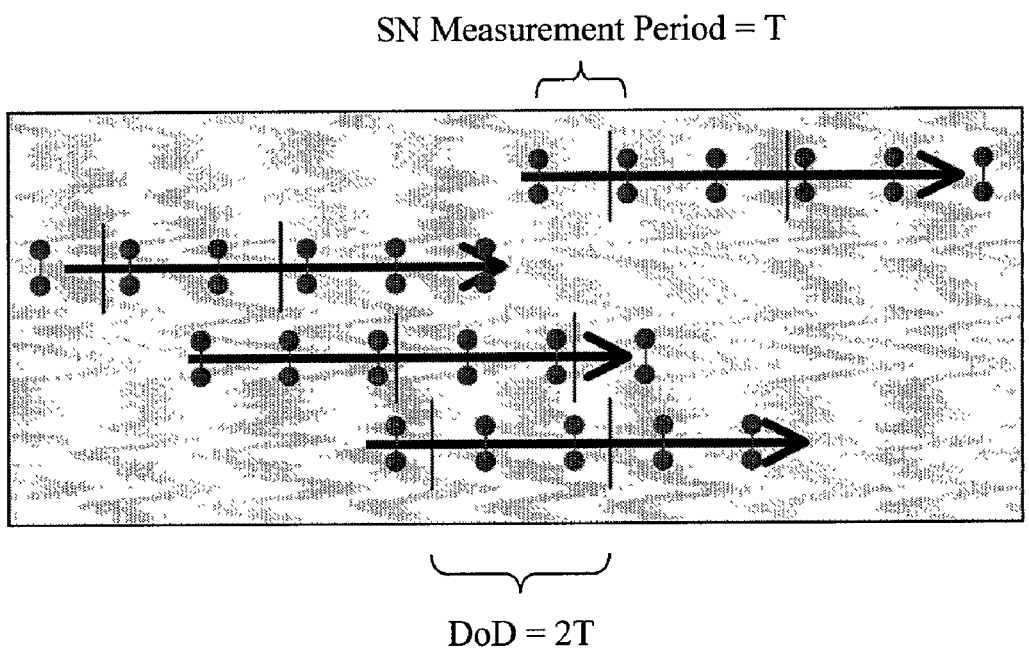
FIG. 7b shows an illustrative example of multiple test packet streams at destination smart nodes according to an embodiment of the present invention.

Statistics collection measurements are taken at the destination SNs SN8', SN6', SN7'. Note that in this example SN SN6' acts as a destination node for two flows and collects separate statistics for each flow identified by unique 5 tuples. FIG. 7b shows the illustrative example of multiple test packet streams at destination SNs according to an embodiment of the present invention. In general, due to timing errors and/or different time required to traverse links with different lengths, each test packet stream arrives at its corresponding destination SN at a different time. The times when SN measurements are taken at the destination SN are represented by short, vertical dumbbells, with the separation between the dumbbells representing the SN measurement period T. The measurements are taken on a period of ½ DoD, ensuring that at least one complete SN measurement period T can be made during the coincidental period. The coincidental period 60 of each packet stream is again represented by vertical lines within each flow in FIG. 7b. As shown in the figure, a complete measurement period is made during each coincidental flow period.

Similar to the notion of packet spreading in the time synchronization network, multiple streams from source SNs SN1', SN2', SN5', SN3' are used to isolate the test segment fi by flooding it with traffic. Generally, no other segments involved in the bandwidth capacity test would be flooded as much as the test segment fi during the test. The statistics for each SN measurement period at the each destination SN SN8', SN6', SN7' are compared to find the period in which the smallest amount of test traffic flowed, i.e., with the lowest byte count. It can be inferred that during this period the segment under test was receiving test traffic flows 20'–50' from all source SNs, thereby reducing individual flow rates. It is noted that the first and last measurement periods at each destination SN should be discounted in the comparison since they will only be partially filled. The individual flow rate of each of the flows 20'–50' in a SN measurement period T at the test segment fi is determined by an equation similar to the one that determines the flow rate of a single packet stream:

$$Rate(\text{bps}) = \frac{Bytes_{total} * 8}{MT_n - MT_{n-1}}$$

where $MT_n$ denotes the measurement time when the lowest byte count is measured, $MT_{n-1}$ denotes the measurement time of the measurement before the lowest byte measurement, and the $Bytes_{total}$ denotes the byte count total during the period with the lowest byte count. The lowest traffic rate of flow received at each of the destination SNs SN8', SN6', SN7' is no higher than the rate of flow of each corresponding flows 20'–50' travelling through the test segment fi. This means that the rate capacity of the test segment fi is at least as high as the sum of all the smallest individual flow rates at the destination SNs SN8', SN6', SN7'. In the illustrative example, only four links are utilized. However, the more links used to flood a particular segment under test, the more accurate the bandwidth capacity measurement.

Many advantages are realized by the present invention for determining network segment and link bandwidth capacity. For example, the present invention is non-intrusive in that the network core is not altered in any way. The SNs SN1–SN8, SN1'–SN8' are added at the more accessible edges of the network or to end host sections EH1–EH8. The bandwidth capacity tests employed by the present system may be run without shutting down the network and without prohibiting best effort traffic. Instead of relying on manufacturer specifications of network devices, which may be difficult to obtain and/or erroneous, the present system runs real traffic tests to determine the segment and link bandwidth capacity. The simplicity and speed of the present method is also advantageous. The length of time needed to run the bandwidth capacity tests is short, and results can be obtained directly without the need for complex statistical analysis. Moreover, there is also the ability to tailor desired accuracy by adjusting a simple parameter in packet burst length or packet stream length.

While the foregoing description refers to particular embodiments of the present invention, it will be understood that the particular embodiments have been presented for purposes of illustration and description. They are not intended to be exhaustive or to limit the invention to the precise forms disclosed. Many modifications and variations are possible in light of the above teachings and may be made without departing from the spirit thereof. For example, although computer networks are used to illustrate examples of the present invention, other types of communication networks, such as wireless and phone networks, may also apply or implement the present invention. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for determining segment bandwidth capacity of a test segment in a network, the method comprising:
   identifying a plurality of links that commonly share the test segment to be tested, the test segment being directly connected to a first router and a second router;
   sending a plurality of packet profiles from a plurality of source nodes to a plurality of destination nodes via the plurality of links, each link of the plurality of links connecting a source node with a destination node, each link including the test segment, and each of the plurality of source nodes being under the centralized control of a central server remote to each of the plurality of source nodes;
   manipulating start times for sending the plurality of packet profiles from the plurality of source nodes so that the plurality of packet profiles flow through the test segment simultaneously, wherein the central server is utilized to command the plurality of source nodes to send the plurality of packet profiles at specific start times; and
   receiving the plurality of packet profiles at the plurality of destination nodes, wherein each of the packet profiles comprises a plurality of packets, and byte count measurements and time stamps are made at the plurality of destination nodes.

2. The method of claim 1, wherein the network is a time synchronized network and each of the plurality of packet profiles is a packet burst.

3. The method of claim 2, wherein the length L of each of the packet bursts is related to a Degree of Desynchronization (DoD) by an expression, $$L = \frac{DoD}{ErrLim},$$

where ErrLim represents a maximum desired error in the segment bandwidth capacity determination.

4. The method of claim 3, wherein the time stamps made at each of the plurality of destination nodes are a first time stamp $TS_{first}$ of the first packet of the packet burst received from each corresponding source node and a last time stamp $TS_{last}$ of the last packet of the packet burst received from each corresponding source node, and the byte count measurements measure the bytes $Bytes_{total}$ in each of the packet bursts received at each corresponding destination node.

5. The method of claim 4, wherein an individual flow rate in bit per second due to each packet burst is calculated using an expression, $$Rate(\text{bps}) = \frac{Bytes_{total} * 8}{TS_{last} - TS_{first}},$$

and a total flow rate through the test segment is the sum of all individual flow rates.

6. The method of claim 1, wherein the network is a non-time synchronized network and each of the plurality of packet profiles is a packet stream, and a plurality of byte count measurements are made over a time measurement period T at each of the plurality of destination nodes.

7. The method of claim 6, wherein the length $L_{multiple}$ of the packet stream is related to a Degree of Desynchronization (DoD) by an expression, $L_{multiple}=(4*T)+2\epsilon$, where the time measurement period T is one half of DoD and epsilon $\epsilon$ is used to compensate for small timing errors.

8. The method of claim 7, wherein the time stamps made at each of the plurality of destination nodes are a plurality of time measurements $MT_n$, where n is an integer, each time measurements $MT_n$ being separated by the time measurement period T and each measuring byte count over the period T since last time measurement $MT_{n-1}$ in each of the packet streams received at each corresponding destination node.

9. The method of claim 8, wherein an individual flow rate in bit per second due to each packet stream at the test segment is related to the smallest byte count measurement $Bytes_{total}$ of all byte count measurements taken for the packet stream, the individual flow rate being calculated using an expression, $$Rate(\text{bps}) = \frac{Bytes_{total} * 8}{MT_n - MT_{n-1}},$$

and a total flow rate through the test segment is the sum of all individual flow rates.

10. The method of claim 1, wherein a link bandwidth capacity of a link is determined by measuring the bandwidth capacity of each of the segments that make up the link, the link having a maximum throughput of the slowest segment in the link.

11. A method for determining bandwidth capacity of a test segment in a time synchronized network, the method comprising:
   identifying a plurality of links that commonly share the test segment to be tested, the test segment being directly connected to a first network device and a second network device;
   sending a plurality of packet bursts from a plurality of source nodes to a plurality of destination nodes via the plurality of links so that the plurality of packet bursts flow through the test segment simultaneously, each link including at least the test segment, each of the plurality of source nodes being under the centralized control of a central server remote to each of the plurality of source nodes, wherein the central server is utilized to command the plurality of source nodes to send the plurality of packet bursts at specific start times; and
   receiving a packet burst of the plurality of packet burst at a destination node of the plurality of destination nodes, the packet burst comprising a plurality of packets, wherein a first time stamp $TS_{first}$ of the first packet of the packet burst, a last time stamp $TS_{last}$ of the last packet of the packet burst and a byte count measurement measuring the bytes $Bytes_{total}$ in the packet burst are made at the destination node, the bandwidth capacity of the test segment in bit per second being calculated using an expression, $$Rate(\text{bps}) = \frac{Bytes_{total} * 8}{TS_{last} - TS_{first}}.$$

12. The method of claim 11, wherein the length L of the packet burst is related to a Degree of Desynchronization (DoD) by an expression, $$L = \frac{DoD}{ErrLim},$$

where ErrLim represents a maximum desired error in the bandwidth capacity determination.

13. A method for determining bandwidth capacity of a test segment in a non-time synchronized network, the method comprising:
   identifying a plurality of links that commonly share the test segment to be tested, the test segment being directly connected to a first network device and a second network device;
   sending a plurality of packet streams from a plurality of source nodes to a plurality of destination nodes via the plurality of links so that the plurality of packet streams flow through the test segment simultaneously, each link including at least the test segment, each of the plurality of source nodes being under the centralized control of a central server remote to each of the plurality of source nodes, wherein the central server is utilized to command the plurality of source nodes to send the plurality of packet streams at specific start times, the plurality of packet streams each having a length $L_{single}$ that ensures at least two measurements for byte count measurement can be made at a destination node;
   receiving the packet streams at the plurality of destination nodes, the packet streams comprising a plurality of packets;
   taking at least two measurements $MT_n$, $MT_{n-1}$ at each of the destination nodes while the packet streams are being received, the two measurements $MT_n$, $MT_{n-1}$ being separated by a measurement period T; and
   making a byte count measurement measuring the bytes $Bytes_{total}$ in each of the packet streams between the measurements $MT_n$, $MT_{n-1}$ at each of the destination nodes, the bandwidth capacity for each of the packet streams of the test segment in bit per second being calculated using an expression, $$Rate(\text{bps}) = \frac{Bytes_{total} * 8}{MT_n - MT_{n-1}},$$

wherein $MT_n$ represents a measurement time when a lowest byte count is measured, $MT_{n-1}$ represents a measurement time before the lowest byte count is measured, and $Bytes_{total}$ represents a byte count total during a measurement period with the lowest byte count, and the total bandwidth capacity equals a sum of all the smallest bandwidth capacities of each of the packet streams.

14. The method of claim 13, wherein the length $L_{single}$ of the packet stream is greater than or equal to (2*T)+2ϵ, where epsilon is used to compensate for small timing error.

15. The method of claim 13, further comprising triggering the destination SN to take a first measurement $MT_{first}$ when it receives the first few packets in the packet stream, wherein the length $L_{single}$ of the packet stream is greater than or equal to T+2ϵ, where epsilon is used to compensate for small timing error.

16. A network system for determining bandwidth capacity of a test segment in a network, comprising:
   a plurality of links interconnecting nodes residing on the edge of the network, each of the links being identified as commonly sharing the test segment;
   a plurality of source nodes that send a plurality of packet profiles for traveling through the plurality of links, each link including the test segment, the plurality of packet profiles being sent at specific start times so that the plurality of packet profiles flow through the test segment simultaneously;
   a central server remote to each of the plurality of source nodes to command the plurality of source nodes to send the plurality of packet profiles at the specific start times; and
   a plurality of destination nodes that receive the plurality of packet profiles, wherein each of the packet profiles comprises a plurality of packets, and byte count measurements and time stamps are made at the plurality of destination nodes.

17. The network system of claim 16, wherein the network is a time synchronized network and each of the plurality of packet profiles is a packet burst.

18. The network system of claim 17, wherein the length L of each of the packet bursts is related to a Degree of Desynchronization (DoD) by an expression, $$L = \frac{DoD}{ErrLim},$$

where ErrLim represents a maximum desired error in the segment bandwidth capacity determination.

19. The network system of claim 18, wherein the time stamps made at each of the plurality of destination nodes are a first time stamp $TS_{first}$ of the first packet of the packet burst received from each corresponding source node and a last time stamp $TS_{last}$ of the last packet of the packet burst received from each corresponding source node, and the byte count measurements measure the bytes $Bytes_{total}$ in each of the packet bursts received at each corresponding destination node.

20. The network system of claim 19, wherein an individual flow rate in bit per second due to each packet burst is calculated using an expression, $$Rate(\text{bps}) = \frac{Bytes_{total} * 8}{TS_{last} - TS_{first}},$$

and a total flow rate through the test segment is the sum of all individual flow rates.

21. The network system of claim 16, wherein the network is a non-time synchronized network and each of the plurality of packet profiles is a packet stream, and a plurality of byte count measurements are made over a time measurement period T at each of the plurality of destination nodes.

22. The network system of claim 21, wherein the length $L_{multiple}$ of the packet stream is related to a Degree of Desynchronization (DoD) by an expression, $L_{multiple} =$ (4*T)+2ϵ, where the time measurement period T is one half of DoD and epsilon ϵ is used to compensate for small timing errors.

23. The network system of claim 22, wherein the time stamps made at each of the plurality of destination nodes are a plurality of time measurements $MT_n$, where n is an integer, each time measurements $MT_n$ being separated by the time measurement period T and each measuring byte count over the period T since last time measurement $MT_{n-1}$ in each of the packet streams received at each corresponding destination node.

24. The network system of claim 23, wherein an individual flow rate in bit per second due to each packet stream at the test segment is related to the smallest byte count measurement $Bytes_{total}$ of all byte count measurements taken for the packet stream, the individual flow rate being calculated using an expression, $$Rate(\text{bps}) = \frac{Bytes_{total} * 8}{MT_n - MT_{n-1}},$$

and a total flow rate through the test segment is the sum of all individual flow rates.

25. The network system of claim 16, wherein a link bandwidth capacity of a link is determined by measuring the bandwidth capacity of each of the segments that make up the link, the link having a maximum throughput of the slowest segment in the link.

26. The network system of claim 16, wherein the nodes are distributed at the edges of the network and exist in stand-alone boxes.

27. The network system of claim 16, wherein the nodes are added as software modules to existing end hosts or network devices.

28. A computer readable medium for use in conjunction with a network system including a plurality of nodes for determining segment bandwidth capacity, the computer readable medium including computer readable instructions encoded thereon for:

identifying a plurality of links that commonly share the test segment to be tested, the test segment being directly connected to a first router and a second router;

sending a plurality of packet profiles from a plurality of source nodes to a plurality of destination nodes via the plurality of links, each link connecting a source node with a destination node, each link including the test segment, and each of the plurality of source nodes being under the centralized control of a central server remote to each of the plurality of source nodes;

manipulating start times for sending the plurality packet profiles from the plurality of source nodes so that the plurality of packet profiles flow through the test segment simultaneously, wherein the central server is utilized to command the plurality of source nodes to send the plurality of packet profiles at specific start times; and receiving the plurality of packet profiles at the plurality of destination nodes, wherein each of the packet profiles comprises a plurality of packets, and byte count measurements and time stamps are made at the plurality of destination nodes.

29. The computer readable medium of claim 28, wherein the network is a time synchronized network and each of the plurality of packet profiles is a packet burst.

30. The computer readable medium of claim 29, wherein the length L of each of the packet bursts is related to a Degree of DoD Desynchronization (DoD) by an expression, $$L = \frac{DoD}{ErrLim},$$

where ErrLim represents a maximum desired error in the segment bandwidth capacity determination.

31. The computer readable medium of claim 30, wherein the time stamps made at each of the plurality of destination nodes are a first time stamp $TS_{first}$ of the first packet of the packet burst received from each corresponding source node and a last time stamp $TS_{last}$ of the last packet of the packet burst received from each corresponding source node, and the byte count measurements measure the bytes $Bytes_{total}$ in each of the packet bursts received at each corresponding destination node.

32. The computer readable medium of claim 31, wherein an individual flow rate in bit per second due to each packet burst is calculated using an expression, $$Rate(\text{bps}) = \frac{Bytes_{total} * 8}{TS_{last} - TS_{first}},$$

and a total flow rate through the test segment is the sum of all individual flow rates.

33. The computer readable medium of claim 28, wherein the network is a non-time synchronized network and each of the plurality of packet profiles is a packet stream, and a plurality of byte count measurements are made over a time measurement period T at each of the plurality of destination nodes.

34. The computer readable medium of claim 33, wherein the length $L_{multiple}$ of the packet stream is related to a Degree of Desynchronization (DoD) by an expression, $L_{multiple} = (4*T)+2ϵ$, where the time measurement period T is one half of DoD and epsilon ϵ is used to compensate for small timing errors.

35. The computer readable medium of claim 34, wherein the time stamps made at each of the plurality of destination nodes are a plurality of time measurements $MT_n$, where n is an integer, each time measurements $MT_n$ being separated by the time measurement period T and each measuring byte count over the period T since last time measurement $MT_{n-1}$ in each of the packet streams received at each corresponding destination node.

36. The computer readable medium of claim 35, wherein an individual flow rate in bit per second due to each packet stream at the test segment is related to the smallest byte count measurement $Bytes_{total}$ of all byte count measurements taken for the packet stream, the individual flow rate being calculated using an expression, $$Rate(\text{bps}) = \frac{Bytes_{total} * 8}{MT_n - MT_{n-1}},$$

and a total flow rate through the test segment is the sum of all individual flow rates.

37. The computer readable medium of claim 28, wherein a link bandwidth capacity of a link is determined by measuring the bandwidth capacity of each of the segments that make up the link, the link having a maximum throughput of the slowest segment in the link.

38. A computer readable medium for use in conjunction with a time synchronized network system including a plurality of nodes for determining segment bandwidth capacity, the computer readable medium including computer readable instructions encoded thereon for:
   identifying a plurality of links that commonly share the test segment to be tested, the test segment being directly connected to a first network device and a second network device;
   sending a plurality of packet bursts from a plurality of source nodes to a plurality of destination nodes via the plurality of links so that the plurality of packet bursts flow through the test segment simultaneously, each link including at least the test segment, each of the plurality of source nodes being under the centralized control of a central server remote to each of the plurality of source nodes, wherein the central server is utilized to command the plurality of source nodes to send the plurality of packet bursts at specific start times; and
   receiving a packet burst of the plurality of packet burst at a destination node of the plurality of destination nodes, the packet burst comprising a plurality of packets, wherein a first time stamp $TS_{first}$ of the first packet of the packet burst, a last time stamp $TS_{last}$ of the last packet of the packet burst and a byte count measurement measuring the bytes $Bytes_{total}$ in the packet burst are made at the destination node, the bandwidth capacity of the test segment in bit per second being calculated using an expression, $$Rate(\text{bps}) = \frac{Bytes_{total} * 8}{TS_{last} - TS_{first}}.$$

39. The computer readable medium of claim 38, wherein the length L of the packet burst is related to a Degree of Desynchronization (DoD) by an expression, $$L = \frac{DoD}{ErrLim},$$

where ErrLim represents a maximum desired error in the bandwidth capacity determination.

40. A computer readable medium for use in conjunction with a non-time synchronized network system including a plurality of nodes for determining segment bandwidth capacity, the computer readable medium including computer readable instructions encoded thereon for:
   identifying a plurality of links that commonly share the test segment to be tested, the test segment being directly connected to a first network device and a second network device;
   sending a plurality of packet streams from a plurality of source nodes to a plurality of destination nodes via the plurality of links so that the plurality of packet streams flow through the test segment simultaneously, each link including at least the test segment, each of the plurality of source nodes being under the centralized control of a central server remote to each of the plurality of source nodes, wherein the central server is utilized to command the plurality of source nodes to send the plurality of packet streams at specific start times, the plurality of packet streams each having a length $L_{single}$ that ensures at least two measurements for byte count measurement can be made at a destination node;
   receiving the packet streams at the plurality of destination nodes, the packet streams comprising a plurality of packets;
   taking at least two measurements $MT_n$, $MT_{n-1}$ at each of the destination nodes while the packet streams are being received, the two measurements $MT_n$, $MT_{n-1}$ being separated by a measurement period T; and
   making a byte count measurement measuring the bytes $Bytes_{total}$ in each of the packet streams between the measurements $MT_n$, $MT_{n-1}$ at each of the destination nodes, the bandwidth capacity for each of the packet streams of the test segment in bit per second being calculated using an expression, $$Rate(\text{bps}) = \frac{Bytes_{total} * 8}{MT_n - MT_{n-1}},$$

wherein $MT_n$ represents a measurement time when a lowest byte count is measured, $MT_{n-1}$ represents a measurement time before the lowest byte count is measured, and $Bytes_{total}$ represents a byte count total during a measurement period with the lowest byte count, and the total bandwidth capacity equals a sum of all the smallest bandwidth capacities of each of the packet streams.

41. The computer readable medium of claim 40, wherein the length $L_{single}$ of the packet stream is greater than or equal to (2*T)+2ϵ, where epsilon is used to compensate for small timing error.

42. The computer readable medium of claim 40, further comprising computer readable instruction encoded thereon for triggering the destination SN to take a first measurement $MT_{first}$ when it receives the first few packets in the packet stream, wherein the length $L_{single}$ of the packet stream is greater than or equal to T+2ϵ, where epsilon is used to compensate for small timing error.

43. The method of claim 1, wherein at least two of the plurality of packet profiles from at least two of the plurality of source nodes may be sent to the same destination node.

44. The network system of claim 16, wherein at least two of the plurality of packet from at least two of the plurality of source nodes profiles may be received by the same destination node.

45. The computer readable medium of claim 28, wherein at least two of the plurality of packet profiles from at least two of the plurality of source nodes may be sent to the same destination node.

* * * * *